United States Patent
Ono et al.

(10) Patent No.: US 10,939,018 B2
(45) Date of Patent: Mar. 2, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Mitsuhiro Ono, Tokyo (JP); Moemi Urano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 16/287,511

(22) Filed: Feb. 27, 2019

(65) Prior Publication Data

US 2019/0273842 A1  Sep. 5, 2019

(30) Foreign Application Priority Data

Mar. 2, 2018 (JP) .............................. JP2018-037241

(51) Int. Cl.
| | |
|---|---|
| H04N 1/60 | (2006.01) |
| H04N 1/00 | (2006.01) |
| H04N 9/64 | (2006.01) |
| H04N 1/62 | (2006.01) |

(52) U.S. Cl.
CPC ....... *H04N 1/6019* (2013.01); *H04N 1/00244* (2013.01); *H04N 1/6063* (2013.01); *H04N 1/62* (2013.01); *H04N 9/646* (2013.01); *H04N 2201/0084* (2013.01)

(58) Field of Classification Search
None
See application file for complete search history.

(56) References Cited

U.S. PATENT DOCUMENTS

| | | | |
|---|---|---|---|
| 2010/0302404 A1 | 12/2010 | Mizukura | |
| 2010/0328343 A1* | 12/2010 | Saito | H04N 1/6058 345/625 |
| 2019/0268504 A1* | 8/2019 | Sato | H04N 1/60 |

FOREIGN PATENT DOCUMENTS

| | | | | |
|---|---|---|---|---|
| EP | 3007424 A1 | 4/2016 | | |
| JP | 2002-218271 A | 8/2002 | | |
| JP | 2002218271 A | * 8/2002 | ........... | H04N 1/6058 |
| JP | 2016-178459 A | 10/2016 | | |

OTHER PUBLICATIONS

English translation of JP 2002218271A Goto (Year: 2002).*
Naoya Katoh; Masahiko Ito; Shin Ohno; "Three-dimensional Gamut Mapping Using Various Color Difference Formulae and Color Spaces," Journal of Electronic Imaging, vol. 8, No. 4, pp. 365-378; Oct. 1999.

* cited by examiner

*Primary Examiner* — James M Hannett
(74) *Attorney, Agent, or Firm* — Canon U.S.A., Inc.

(57) ABSTRACT

An image processing apparatus includes a control unit configured to control a conversion characteristic for converting image data based on a first color space into image data based on a second color space based on a difference between a specific color and a peripheral color of the specific color in the first color space, wherein the control unit changes a first conversion characteristic into a second conversion characteristic such that a color difference between the specific color and the peripheral color converted by the second conversion characteristic is greater than a color difference between the specific color and the peripheral color converted by the first conversion characteristic.

14 Claims, 9 Drawing Sheets

IMAGE PROCESSING APPARATUS, IMAGE PROCESSING METHOD, AND STORAGE MEDIUM

BACKGROUND OF THE INVENTION

Field of the Invention

The present invention relates to an image processing technique for processing an image.

Description of the Related Art

Image data used for a network camera is compliant with a standard such as a recommendation ITU-R BT.709 created by the International Telecommunication Union Radiocommunication Sector (ITU-R). Image data is compliant with this standardized standard, so that a color gamut of a color space thereof is also defined thereby. However, image data in a wide color gamut outside the defined color gamut of the color space is mapped onto the color gamut of the color space defined by the standard through gamut mapping. As a method of the gamut mapping, Japanese Patent Application Laid-Open No. 2016-178459 discusses a method for making a general impression of a color of an object displayed on a display apparatus conform to that of an actual color of the object while maintaining a specific color.

However, with the method described in Japanese Patent Application Laid-Open No. 2016-178459, although the specific color can be maintained when the image data is to be mapped onto the color gamut of the color space defined by the standard through the gamut mapping, a relationship between the specific color and its peripheral color may not be maintained. Therefore, for example, there is a case where the specific color and the peripheral color cannot be distinguished from each other, or the relationship between the specific color and the peripheral color is changed after the image data is mapped onto the color space defined by the standard through the gamut mapping.

SUMMARY OF THE INVENTION

According to an aspect of the present invention, an image processing apparatus includes at least one processor and/or a circuit configured to function as the following unit: a control unit configured to control a conversion characteristic for converting image data based on a first color space into image data based on a second color space based on a difference between a specific color and a peripheral color of the specific color in the first color space, wherein the control unit changes a first conversion characteristic into a second conversion characteristic such that a color difference between the specific color and the peripheral color converted by the second conversion characteristic is greater than a color difference between the specific color and the peripheral color converted by the first conversion characteristic.

Further features of the present invention will become apparent from the following description of exemplary embodiments with reference to the attached drawings.

DESCRIPTION OF THE EMBODIMENTS

Hereinafter, an exemplary embodiment of the present invention will be described in detail with reference to the appended drawings.

In the present exemplary embodiment, an apparatus which processes an image captured by an imaging apparatus (i.e., network camera) such as a monitoring camera connected to the network will be described as one application example of the image processing apparatus. In addition, the imaging apparatus according to the present exemplary embodiment is not limited to the network camera, and may be a digital single-lens reflex camera, a mirrorless single-lens camera, a compact digital camera, a camcorder, a car-mounted camera, a medical camera, or an industrial camera. Alternatively, the imaging apparatus may be a tablet terminal, a personal handy-phone system (PHS), a smartphone, a feature phone, or an imaging device mounted on a mobile information terminal such as a handheld game machine. Further, the image processing apparatus according to the present exemplary embodiment may be mounted on an imaging apparatus such as a network camera, or may be mounted on a dedicated control apparatus, a personal computer (PC), or a mobile information terminal which controls the imaging apparatus or receives and processes the image data transmitted from the imaging apparatus.

Figure 1:
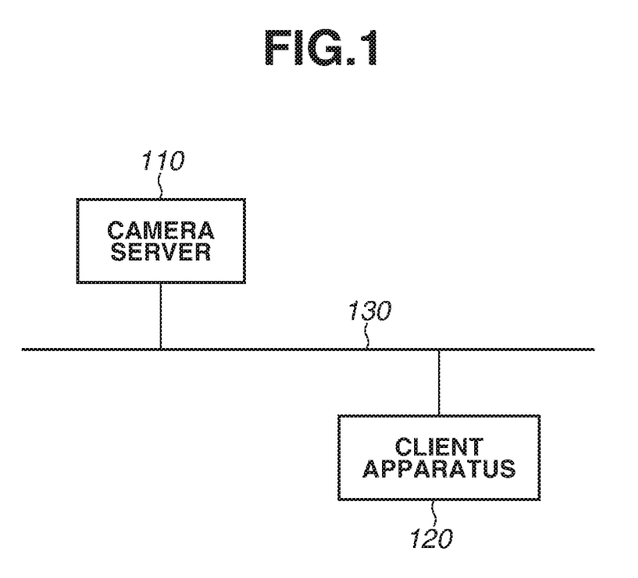
FIG. 1 is a block diagram illustrating an example of a schematic system configuration.

FIG. 1 is a block diagram illustrating an example of a schematic configuration of the network camera system of the present exemplary embodiment.

As illustrated in FIG. 1, the network camera system of the present exemplary embodiment is configured of a camera server 110, a viewer client apparatus 120 (hereinafter, referred to as "client apparatus 120"), and a network 130.

The camera server 110 includes a communication apparatus for connecting to the network 130 in addition to a camera, and image data captured by the camera is transmitted via the network 130. Further, the camera server 110 can transmit data other than the image data. In addition, the camera may be separated from a server. Further, the camera can capture a still image as well as a moving image.

The client apparatus 120 accesses the camera server 110 via the network 130 to change various settings of the camera or receive image data captured by the camera. Further, in the present exemplary embodiment, the client apparatus 120 executes various kinds of processing on image data received from the camera server 110 via the network 130 or image data previously stored therein, or displays an image based on the processed image data.

The network 130 communicably connects the camera server 110 and the client apparatus 120. For example, the network 130 is configured of a plurality of routers, switches, and cables which satisfies a communication standard such as the Ethernet (registered trademark). In the present exemplary embodiment, a communication standard, a scale, or a configuration of the network 130 is not taken into consideration as long as the communication between the camera server 110 and the client apparatus 120 can be executed without difficulty. Accordingly, the internet as well as the wireless local area network (LAN) can be employed as the network 130.

Figure 2:
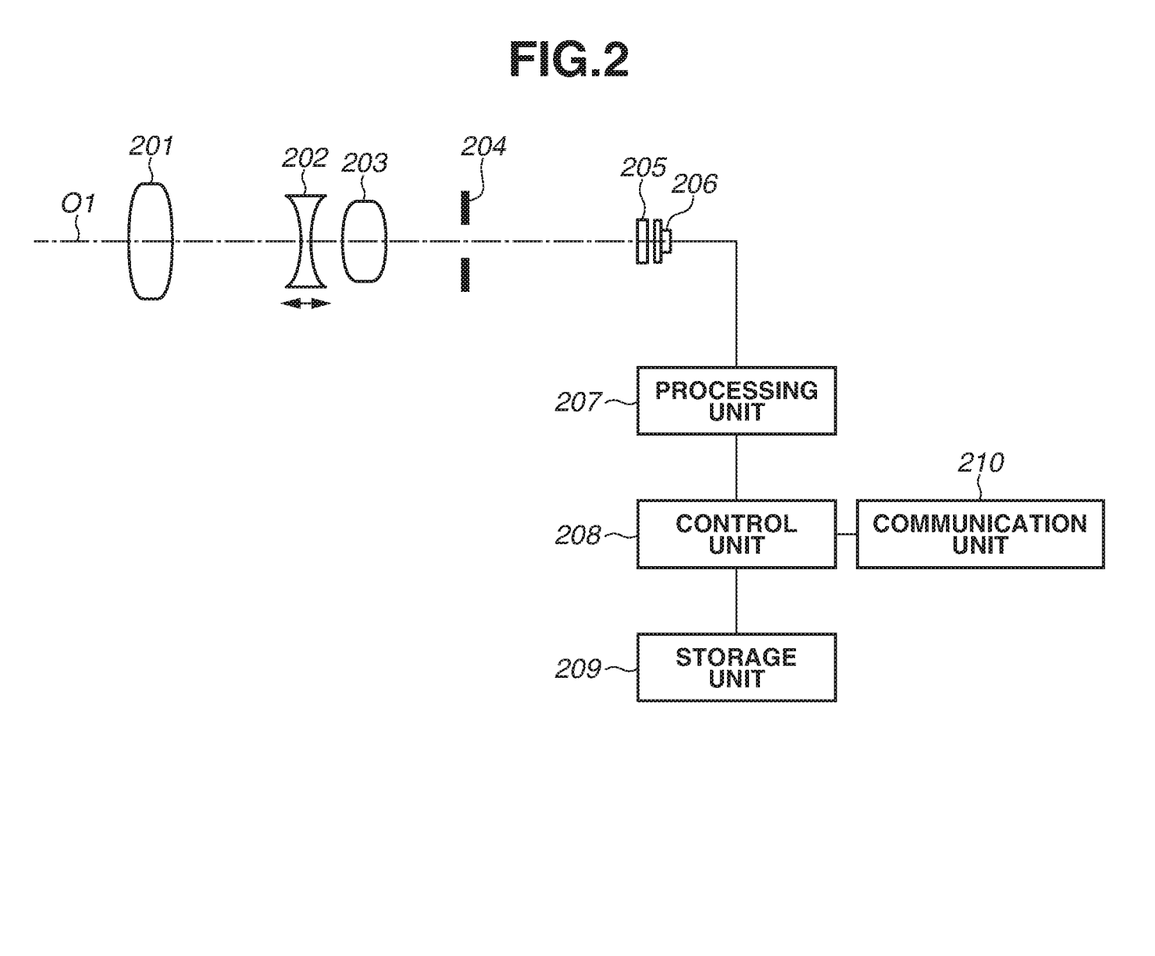
FIG. 2 is a block diagram illustrating an example of a schematic configuration of an imaging apparatus.

FIG. 2 is a block diagram illustrating an example of a configuration of the camera server 110 (mainly a configuration of the camera) of the present exemplary embodiment.

In FIG. 2, an optical axis O1 is expressed by a dashed-dotted line, and a lens optical system configured of an objective lens 201, a focus lens 202, and an imaging lens 203, an aperture 204, a filter 205, and an image sensor 206 are arranged on the optical axis O1. The image sensor 206 is configured of a charge coupled device (CCD) sensor or a complementary metal oxide semiconductor (CMOS) sensor. The image sensor 206 executes photoelectric conversion of an optical image of light passing through the lens optical system, the aperture 204, and the filter 205, which is formed on an imaging surface, to generate an image signal and further executes analog-digital conversion to output image data. The image data output from the image sensor 206 is transmitted to a processing unit 207. A configuration and operation of the processing unit 207 will be described below in detail.

Further, the image data output from the image sensor 206 is also transmitted to a control unit 208 via the processing unit 207.

A storage unit 209 is connected to the control unit 208, and the control unit 208 stores image data output from the image sensor 206 in the storage unit 209. Furthermore, the control unit 208 may include a central processing unit (CPU). In this case, the CPU included in the control unit 208 executes a control program stored in the storage unit 209 or a read only memory (ROM) (not illustrated) to realize various functional operations of the camera server 110. Further, the CPU of the control unit 208 may execute a program to realize all or a part of functions of respective elements relating to signal processing in the camera server 110. Furthermore, at least a part of the respective elements of the camera server 110 may be operated by dedicated hardware. In this case, the dedicated hardware is operated based on control of the control unit 208. A communication unit 210 is also connected to the control unit 208.

The network 130 is connected to the communication unit 210. The communication unit 210 transmits captured image data or metadata relating to a captured image to the client apparatus 120 via the network 130. The communication unit 210 can receive a command from the client apparatus 120 via the network 130 to transmit the command to the control unit 208. Further, the communication unit 210 can connect an external device (not illustrated) such as an external storage or an external computer to the control unit 208, so that captured images can be transferred to the external device. In addition, the external device such as the external computer can transmit a command to the control unit 208 via the communication unit 210 to provide an instruction for starting or ending imaging operation.

Figure 3:
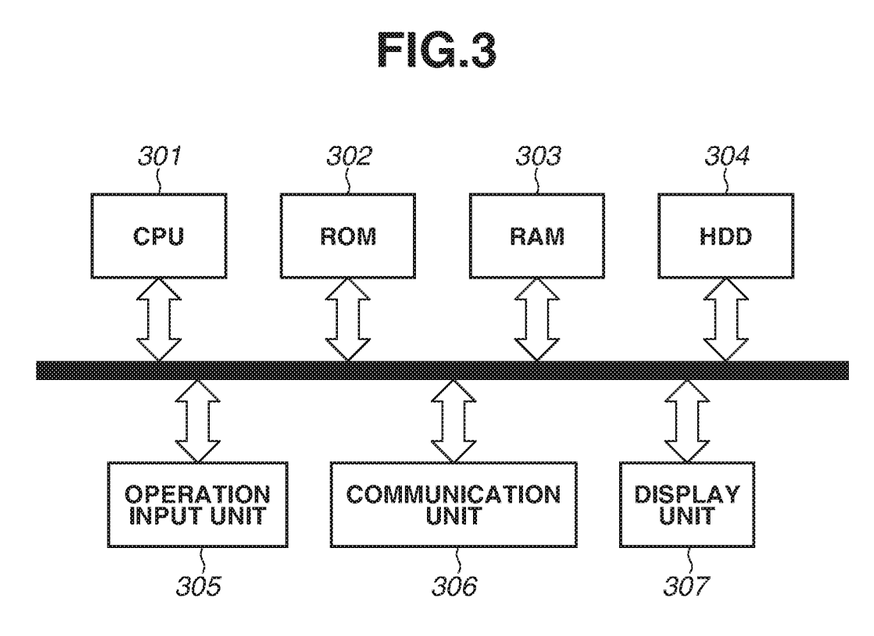
FIG. 3 is a block diagram illustrating an example of a schematic configuration of a viewer client apparatus.

FIG. 3 is a block diagram illustrating an example of a schematic configuration of the client apparatus 120 of the present exemplary embodiment.

In FIG. 3, a CPU 301 generally controls operations executed by the client apparatus 120. A ROM 302 is a non-volatile memory which stores a control program necessary for the CPU 301 to execute processing. A random access memory (RAM) 303 functions as a main memory or a work area of the CPU 301. In other words, when the processing is to be executed, the CPU 301 loads a necessary program onto the RAM 303 from the ROM 302 and executes the program to realize various functional operations or signal processing. The CPU 301 executes the program to realize all or a part of the functions of respective elements of the client apparatus 120. However, at least a part of the respective elements of the client apparatus 120 may be operated by dedicated hardware. In this case, the dedicated hardware is operated based on control of the CPU 301.

For example, a hard disk drive (HDD) 304 stores various kinds of data or information necessary for the CPU 301 to execute processing using the program. Further, for example, the HDD 304 stores various kinds of data or information acquired through the processing using the program executed by the CPU 301.

An operation input unit 305 is an input unit for acquiring an operation signal from an operation device such as a power button, a keyboard, or a mouse (not illustrated).

A display unit 307 displays an image acquired from the camera server 110 or a graphical user interface (GUI) for inputting various control parameters of the camera server 110.

A communication unit 306 executes processing for enabling the client apparatus 120 to communicate with the network 130. Specifically, the communication unit 306 receives image data captured by the camera server 110 via the network 130. Further, for example, the communication unit 306 transmits a camera setting command which is generated by the CPU 301 based on the operation signal received from the operation input unit 305, to the camera server 110 via the network 130, and receives a response or necessary data other than image data.

Figure 4:
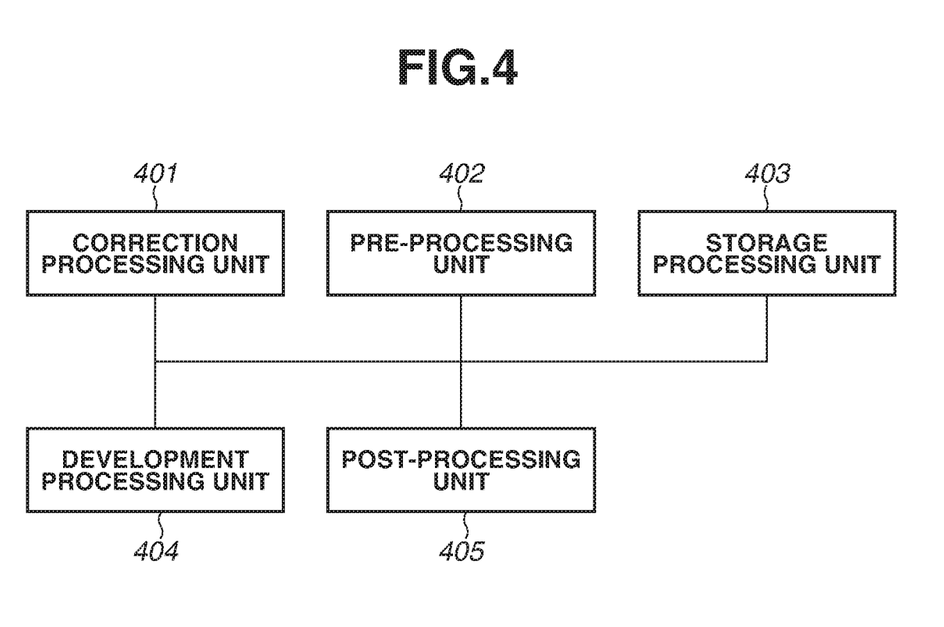
FIG. 4 is a block diagram of a processing unit of an imaging apparatus.

FIG. 4 is a block diagram illustrating an example of an internal configuration of the processing unit 207 of the camera server 110 of the present exemplary embodiment.

In FIG. 4, a correction processing unit 401 executes correction on the input image data based on a characteristic of the lens optical system or a sensor characteristic of the image sensor 206.

A pre-processing unit 402 executes pre-development processing such as gain adjustment, noise reduction processing, white balance (WB) adjustment, or sharpness processing on the image data input thereto.

A storage processing unit 403 stores, in a memory, image data on which pre-processing has been executed by the pre-processing unit 402 or image data on which development processing has been executed by a development processing unit 404. A memory of the storage processing unit 403 may be a detachable semiconductor memory such as a so-called secure digital (SD) card. A post-processing unit 405 executes image processing such as noise reduction processing or color correction processing on the image data after development processing described below.

The development processing unit 404 executes development processing such as de-mosaic processing, tone curve processing including color space compression, or color space conversion processing on RAW image data received from the image sensor 206. The development processing executed by the development processing unit 404 includes color space conversion processing for converting a color of the color space (hereinafter, referred to as "RAW color space") included in the RAW image into a color of a standard color space as a transmission color space (hereinafter, referred to as "standard color space") with which the camera server 110 transmits the image. In the present exemplary embodiment, a below-described color conversion table (i.e., three-dimensional look-up table (hereinafter, referred to as "3D LUT")) will be used for the color space conversion processing in the development processing executed by the development processing unit 404. In the present exemplary embodiment, although the 3D LUT is used as the information that expresses the conversion characteristic, the information is not limited to the 3D LUT. For example, a function or an arithmetic equation that expresses a conversion characteristic may be used.

In the present exemplary embodiment, the 3D LUT is set to the development processing unit 404 of the processing unit 207 under the control executed by the control unit 208. Further, in the present exemplary embodiment, a basic 3D LUT is previously prepared. Then, according to the present exemplary embodiment, the basic 3D LUT previously set to the development processing unit 404 can be modified as necessary, and the color space conversion processing executed in the development processing of the development processing unit 404 is controlled by modifying the basic 3D LUT. Although details thereof will be described below, modification of the basic 3D LUT may be executed by the client apparatus 120, or may be executed by the control unit 208 of the camera server 110 by controlling the processing unit 207 based on the information from the client apparatus 120.

Here, prior to detailed description of 3D LUT generation processing, description will be given with respect to the use case as in the present exemplary embodiment, in which the image captured by the camera of the camera server 110 is transmitted to and displayed on the client apparatus 120, and a point to note with respect to the use case.

In the present exemplary embodiment, as one example, a use case in which importance is placed on a difference between a specific color and its peripheral color will be described. As a use case in which importance is placed on a difference between a specific color and its peripheral color, for example, it is assumed that a coin used in a recreation hall such as a casino is captured by a monitoring camera, and the coin is determined to be legitimate or illegitimate based on the color of the coin in a captured image. In the use case, a difference between colors of a legitimate coin and an illegitimate coin in an image captured by the camera server 110 has to be also maintained by the client apparatus 120. Therefore, there is a risk in that legitimacy or illegitimacy of the coin is erroneously determined if the client apparatus 120 does not maintain the color difference. Further, as another use case, for example, it is assumed that an image of a fruit in a fruit garden is captured by a camera, and a degree of ripeness of the fruit is determined by checking whether a color of the fruit in the captured image is a target color of a ripe fruit or a color of an unripe fruit. In the use case, similarly, a difference between colors of a ripe fruit and an unripe fruit in the captured image has to be also maintained by the client apparatus 120. Therefore, there is a risk in that a degree of ripeness of the fruit may be erroneously determined if the client apparatus 120 does not maintain the color difference.

On the other hand, in a case where the captured image is transmitted to the client apparatus 120 from the camera server 110, the development processing unit 404 of the camera server 110 executes color space conversion processing for converting the RAW color space as a color space of the captured image into a standard color space as a color space specified by the standard. The above-described color space conversion processing is executed by using the 3D LUT, and image data after the color space conversion processing is transmitted to the client apparatus 120 from the camera server 110. Then, if the captured image of the RAW color space is converted to an image of the standard color space through the color space conversion processing using the 3D LUT, there is a case where a difference between a specific color and a peripheral color in the captured image cannot be maintained by the client apparatus 120.

Figure 5:
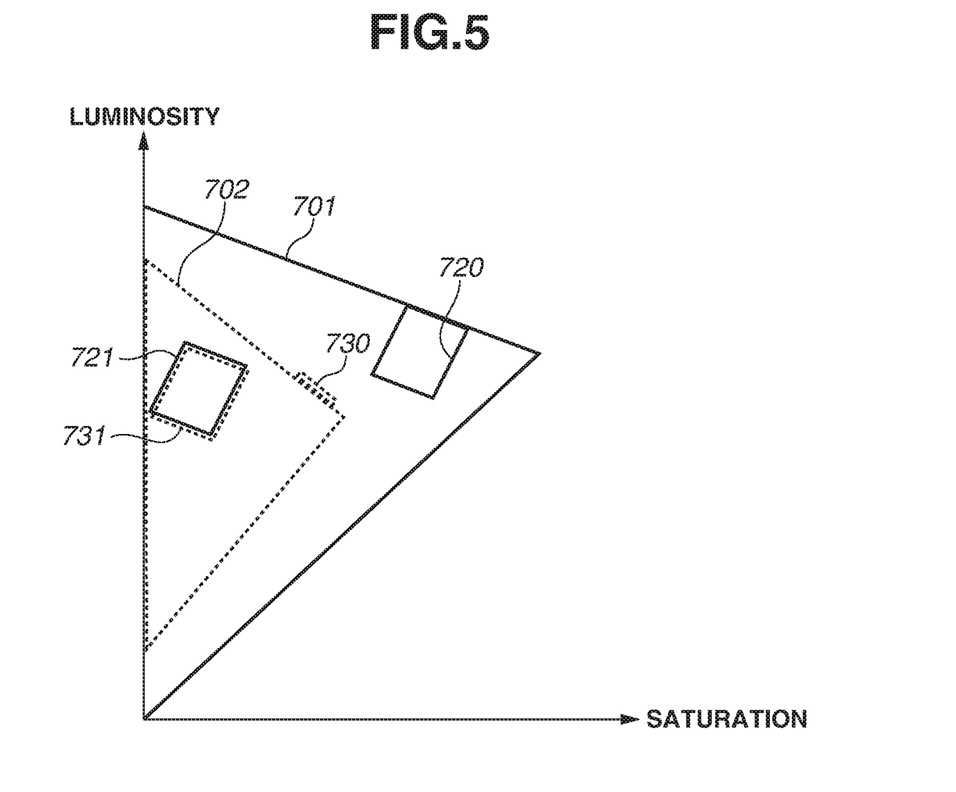
FIG. 5 is a diagram used for describing color space conversion processing using a basic 3-dimensional look-up table (3D LUT).

FIG. 5 is a diagram used for describing the color space conversion processing executed by the development processing unit 404 of the camera server 110 by using the preset basic 3D LUT. FIG. 5 is a diagram illustrating a color space of luminosity and saturation. In FIG. 5, a RAW color space 701 unique to the camera of the camera server 110 is expressed by a solid line, whereas a standard color space 702 is expressed by a dotted line.

The basic 3D LUT used for the color space conversion processing executed by the development processing unit 404 is a color conversion table for converting the RAW color space 701 unique to the camera of the camera server 110 into the standard color space 702, and each of RGB values is divided by six grids. In the color space conversion processing using the basic 3D LUT, the processing is executed so that one color reproducible within a color gamut of the standard color space 702 from among the colors in the RAW color space 701 regarded as input colors conforms to the one color after the color space conversion processing. On the other hand, in the color space conversion processing using the basic 3D LUT, a non-reproducible color outside the color gamut of the standard color space 702 from among the colors in the RAW color space 701 regarded as input colors is mapped on a boundary portion of the color gamut of the standard color space 702.

In other words, from among the colors in the RAW color space 701, one color within a range of the standard color space 702 is converted such that an input color and an output color of the color space conversion processing using the basic 3D LUT conform to each other. However, another color without the range of the standard color space 702 is compressed to a boundary portion of the standard color space 702. For example, as illustrated in FIG. 5, from among the grids in the RAW color space 701, a grid 721 within a range of the standard color space 702 is converted to a grid 731 of a position that is substantially the same as the position (i.e., substantially the same color) of the grid 721 through the color space conversion processing using the basic 3D LUT. On the other hand, as a result of the color space conversion processing using the basic 3D LUT, a grid 720 without the range of the standard color space 702 from among the grids in the RAW color space 701 is compressed to a grid 730 at a boundary portion of the standard color space 702.

Therefore, in a case where a part of the grid that includes a specific color and its peripheral color of the captured image is located outside the color gamut of the standard color space, the color located outside the color gamut is compressed to a boundary portion of the standard color space, so that the client apparatus 120 cannot maintain a difference between the specific color and the peripheral color of the captured image. In such a case, for example, in a use case in which the client apparatus 120 determines whether a coin used at a recreation hall is a legitimate coin or an illegitimate coin by looking at a color of the coin imaged by the camera server 110, there is a risk in which determination of a legitimate coin and an illegitimate coin may be erroneously made. In other words, in a use case in which importance is placed on a difference between the specific color and its peripheral color of the captured image, the client apparatus 120 has to maintain a difference between the colors in the captured image if the camera server 110 executes the color space conversion processing on the captured image and transmits the resultant.

Therefore, in the present exemplary embodiment, a basic 3D LUT used for the color space conversion processing is modified as necessary when the color space conversion processing is executed, so that a color difference between the specific color and the peripheral color in the captured image can be also maintained by the client apparatus 120. In other words, in the present exemplary embodiment, the color space conversion processing is controlled by modifying the basic 3D LUT, so that a color difference between the specific color and the peripheral color in the captured image can be also maintained by the client apparatus 120.

Hereinafter, with reference to FIGS. 6 to 9, generation processing of the 3D LUT in the present exemplary embodiment, e.g., processing for controlling color space conversion by modifying the basic 3D LUT, will be described in detail. The processing for modifying the basic 3D LUT may be executed by the client apparatus 120 or the camera server 110. In the below-described exemplary embodiment, processing for modifying the basic 3D LUT executed by the client apparatus 120 will be described.

First, with reference to the flowchart in FIG. 6, an example of control processing for modifying the 3D LUT as necessary, executed by the client apparatus 120, will be described. In this example, under the control of the client apparatus 120, a basic 3D LUT previously set to the development processing unit 404 of the processing unit 207 of the camera server 110 is modified. In the below-described flowchart in FIG. 6, the CPU 301 executes a program loaded on the RAM 303 from the ROM 302 in FIG. 3 to execute the processing to be executed by the client apparatus 120. Further, the control unit 208 in FIG. 2 controls respective units to execute the processing to be executed by the camera server 110.

Figure 6:
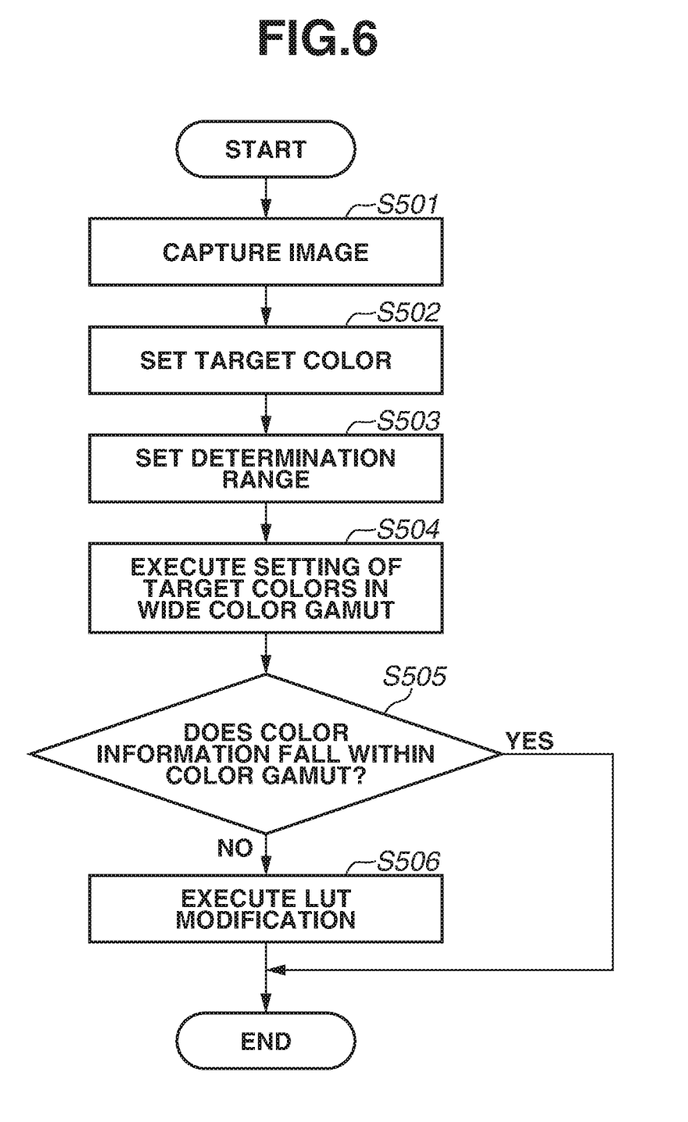
FIG. 6 is a flowchart illustrating processing for capturing an image and creating a 3D LUT.

In step S501 in FIG. 6, the CPU 301 of the client apparatus 120 captures an image from a moving image transmitted from the camera server 110. Here, a frame of the moving image transmitted to the client apparatus 120 from the camera server 110 is an image on which development processing is executed by the development processing unit 404. Therefore, in step S501, the CPU 301 captures the image after the development processing. The captured image is an image of the standard color space on which color space conversion processing has been executed by the development processing unit 404 of the camera server 110 in the development processing.

Figure 7:
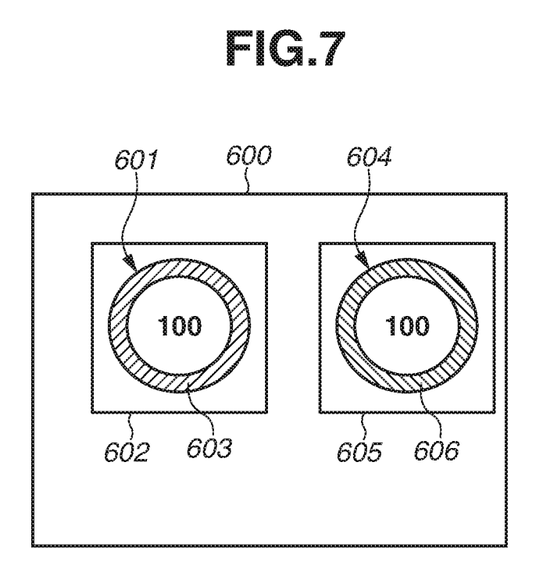
FIG. 7 is a diagram illustrating an example of a captured image and color specification.

FIG. 7 is a diagram illustrating an example of an image 600 captured in step S501. As illustrated in FIG. 7, a legitimate game coin 601 as a recognition target and an illegitimate game coin 604 as an identification target are included in the captured image 600.

The CPU 301 of the client apparatus 120 transmits frame information about the captured image (e.g., information such as a frame number, by which the image captured from the moving image can be identified) to the camera server 110 via the communication unit 306 together with an image request command. The control unit 208 of the camera server 110 receives the image request command via the communication unit 210 to specify the image captured by the client apparatus 120 based on the frame information included in the command. As described above, the camera server 110 stores images before development processing in the storage processing unit 403, so that the control unit 208 specifies an image corresponding to the frame information about the image captured by the client apparatus 120 from among the stored images before development processing. Then, the control unit 208 transmits the specified image data before development processing to the client apparatus 120 via the communication unit 210. In other words, the image before development processing, transmitted to the client apparatus 120 from the camera server 110 at that time, is the image of the RAW color space on which the color space conversion processing has not been executed. The client apparatus 120 receives the image data before development processing and stores the image data in the RAM 303 or the HDD 304.

Subsequently, in step S502, the CPU 301 of the client apparatus 120 uses the image captured in step S501 to set a position of a recognition target color in the legitimate coin 601 as a recognition target. In this case, the CPU 301 sets a color area 603 of the recognition target in the legitimate coin 601 and an area 602 having a rectangular shape which surrounds the coin 601 to the captured image 600. In addition, a shape of the area 602 is not limited to the rectangular shape, and the area 602 may be in another shape as long as the coin 601 can be surrounded thereby. Then, with respect to the color area 603 of the recognition target within the set rectangular area 602, the CPU 301 sets a color within a preset variation range as a specified color, and stores an area of each pixel of a color included in the specified color in the RAM 303 or the HDD 304 as a specified color area. The variation range may be previously set, or may be optionally set by a user via the GUI of the display unit 307 of the client apparatus 120. In a case where the user can set the variation range, a specified color area according to the variation range set by the user may be displayed, and the user can specify the color area to be specified by setting the variation range while looking at the display of the display unit 307.

Next, in step S503, the CPU 301 uses the image captured in step S501 to execute processing similar to the processing executed in step S502 with respect to the illegitimate coin 604 as an identification target, and sets a color area 606 as an identification target in the illegitimate coin 604 and an area 605 having a rectangular shape. Furthermore, through the processing similar to the processing in step S502, the CPU 301 sets a color within the variation range as a specified color and stores an area of each pixel of a color set as the specified color as a specified color area.

As described above, through the processing in steps S502 and S503, a specified color in the legitimate coin 601 as a recognition target and a specified color in the illegitimate coin 604 as an identification target based on the captured image are set as the color information of a determination range.

Next, in step S504, the CPU 301 makes setting of a recognition target color and an identification target color in a wide color gamut. In the present exemplary embodiment, the wide color gamut corresponds to a color gamut in the RAW color space of the RAW image captured by the camera of the camera server 110, and the wide color gamut is a color gamut relatively wide with respect to a color gamut of the standard color space as a transmission color space when the camera server 110 transmits an image. In step S504, in the wide color gamut, setting of the recognition target color of the legitimate coin 601 and setting of the identification target color of the illegitimate coin 604 are made. Therefore, by using the RAW image before development processing acquired from the camera server 110 in association with the image captured in step S501, the CPU 301 executes processing similar to the processing in steps S502 and S503 to set the recognition target color and the identification target color in the wide color gamut.

Then, the color information about the legitimate coin 601 and the illegitimate coin 604 in the wide color gamut acquired based on the RAW image is set as the color information to be compared with the color in the determination range based on the captured image described above. For example, the color information used for the above comparison is stored in the RAM 303 or the HDD 304, and used for modifying the basic 3D LUT as described below. In addition, the color information acquired based on the RAW image may be an average value of the RGB values of a corresponding specified color area, or may be information about a created profile of the RAW image converted into an XYZ space or a L*a*b space. In the present exemplary embodiment, the recognition target color in the wide color gamut corresponds to a specific color in the use case in which importance is placed on a difference between the specific color and its peripheral color of an image captured by the camera, whereas the identification target color in the wide color gamut corresponds to the peripheral color of the specific color.

In step S505, the CPU 301 executes determination of the color gamut based on the color information of the determination range acquired through the processing in steps S502 and S503 and the color information acquired through the processing in step S504. For example, the CPU 301 determines whether the color information acquired from the RAW image in step S504 falls within a range of the standard color space as a transmission color space of the camera server 110. Then, as a result of the color gamut determination, if the CPU 301 determines that the color information acquired in step S504 falls within the range (color gamut) of the standard color space (YES in step S505), the processing of the flowchart in FIG. 5 ends. On the other hand, if the CPU 301 determines that the color information acquired in step S504 does not fall within the range (color gamut) of the standard color space (NO in step S505), the processing proceeds to step S506.

In the above-described exemplary embodiment, although the color information is acquired based on the image, the color may be measured by using a colorimeter, and the processing up to step S505 may be executed based on the color information acquired by using the colorimetric value.

When the processing proceeds to step S506, generation processing of the 3D LUT is executed. The 3D LUT is used for the color space conversion processing executed when the development processing unit 404 of the camera server 110 executes the development processing. In the present exemplary embodiment, the 3D LUT used for the color space conversion processing is generated by modifying the basic 3D LUT previously set to the development processing unit 404. The 3D LUT generation processing in step S506 may be executed by the CPU 301 of the client apparatus 120, or may be executed by the processing unit 207 under the control of the control unit 208 of the camera server 110. Details of the LUT modification processing in step S506 will be described below.

Next, with reference to FIGS. 8 and 9, details of 3D LUT generation processing through modification of the basic 3D LUT in step S506 in FIG. 6 will be described. Here, an example in which the CPU 301 of the client apparatus 120 generates the 3D LUT will be described first. An example in which the processing unit 207 generates the 3D LUT under the control of the control unit 208 of the camera server 110 will be described below.

Figure 8:
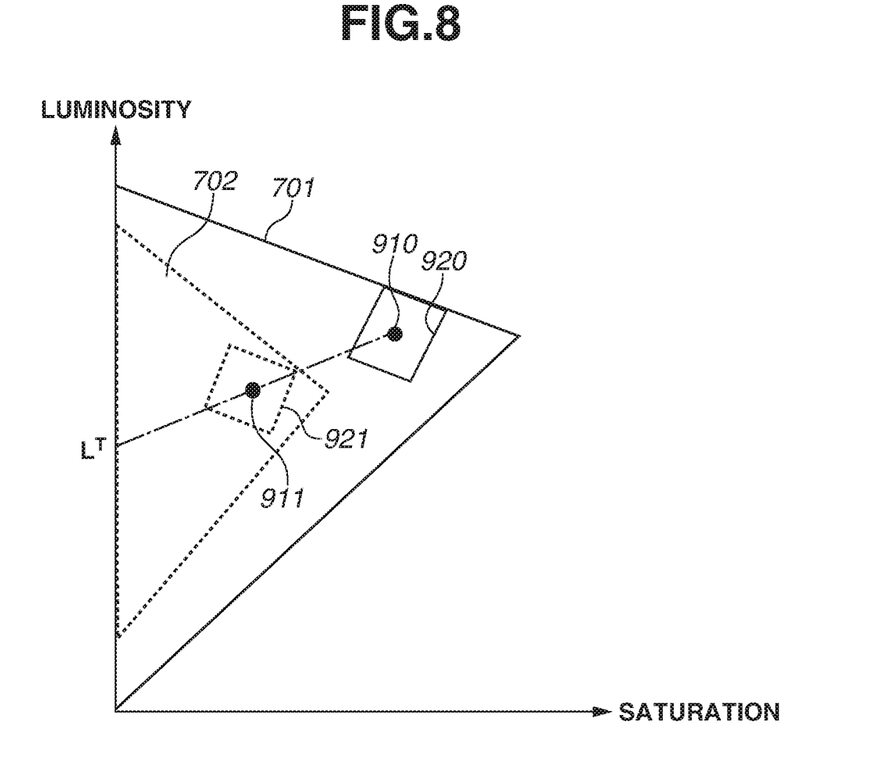
FIG. 8 is a diagram used for describing color space conversion processing using a corrected 3D LUT.

FIG. 8 is a diagram used for describing the color space conversion processing using the 3D LUT generated by modifying the basic 3D LUT. Similar to the above-described diagram in FIG. 5, the diagram in FIG. 8 illustrates a color space of luminosity and saturation. In FIG. 8, the RAW color space 701 is expressed by a solid line, whereas the standard color space 702 is expressed by a dotted line.

In the example in FIG. 8, the above-described recognition target color as a specific color in the RAW color space 701 is expressed by a plot 910, and the recognition target color expressed by the plot 910 is positioned outside the color gamut of the standard color space 702. Further, the above-described identification target color as the peripheral color is a color within a range of a grid (referred to as "peripheral grid 920") including the plot 910 of the RAW color space 701. Furthermore, in FIG. 8, a luminosity $L^T$ represents a luminosity that is to be a target when the color space conversion processing is executed by the development processing unit 404. In this example, the luminosity $L^T$ is a luminosity point of 50%.

In the present exemplary embodiment, the 3D LUT generated by modifying the basic 3D LUT is a 3D LUT for converting the plot 910 and the peripheral grid 920 in the RAW color space 701 in FIG. 8 into a plot 911 and a peripheral grid 921 in the standard color space 702. In other words, the modified 3D LUT is an LUT for converting the plot 910 and the peripheral grid 920 to be positioned at a position on a straight line that connects the plot 910 and the luminosity $L^T$, separated from a boundary of the standard color space 702 by an amount corresponding to the color difference between the plot 910 and the peripheral grid 920.

Figure 9:
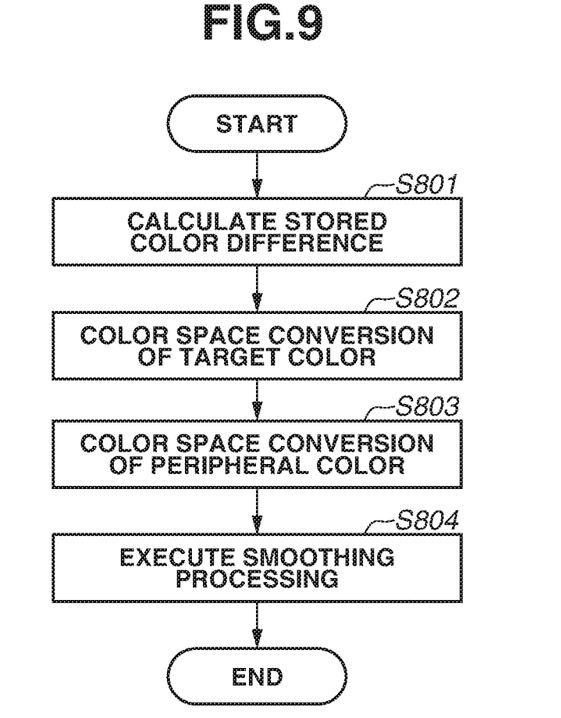
FIG. 9 is a flowchart illustrating processing for creating a 3D LUT.

FIG. 9 is a flowchart illustrating a flow of processing for generating the 3D LUT by modifying the basic 3D LUT as illustrated in FIG. 8. The processing of the flowchart in FIG. 9 illustrates details of the processing for generating the 3D LUT by modifying the basic 3D LUT in step S506 in FIG. 6.

In step S801 in FIG. 9, the CPU 301 of the client apparatus 120 acquires the color information stored in the RAM 303 or the HDD 304 as described above, and calculates a difference between these colors (referred to as "stored color difference"). Here, color information used for calculating the color difference is the color information in the RAW color space acquired and stored in step S504 described above. Accordingly, in step S801, a difference between colors of the legitimate coin and the illegitimate coin in the RAW color space (wide color gamut space) of the RAW image is calculated as the stored color difference, and in the example in FIG. 8, the color difference corresponds to the color difference between the plot 910 and the peripheral grid 920. In the present exemplary embodiment, for example, a color difference in a color space of the CIE ΔE 1976 is used as a color difference. However, a color difference in a color space of the CIE ΔE 1994 or the CIE ΔE 2000 can also be used.

Next, in step S802, the CPU 301 executes color space conversion processing using the basic 3D LUT with respect to the recognition target as the specific color. In the example in FIG. 8, a plot after the color space conversion processing is acquired with respect to the plot 910.

Further, in step S803, with respect to the identification target color as the peripheral color, the CPU 301 executes the color space conversion processing using the basic 3D LUT. In the example in FIG. 8, a peripheral grid after the color space conversion processing is acquired with respect to the peripheral grid 920.

Further, as the plot 911 in FIG. 8, the CPU 301 sets a plot having a positional relationship in which a color difference between the plot and the peripheral grid after the color space conversion processing acquired in steps S802 and S803 is substantially equal to the stored color difference acquired in step S801. Through the above-described processing, the CPU 301 can execute conversion while maintaining a relationship of the color difference between the plot 910 and the peripheral grid 920. Similarly, the CPU 301 executes the processing continuously if there is a peripheral grid having a color difference with respect to the plot 911 smaller than the stored color difference acquired in step S801.

Next, in step S804, the CPU 301 executes smoothing processing with respect to the grid on which the color space conversion processing is executed in step S803. Because a gap is generated between the peripheral grid repositioned through the processing in steps up to S803 and the non-repositioned grid adjacent to the peripheral grid, the CPU 301 eliminates the gap to make an interval uniform in the smoothing processing. For example, the CPU 301 executes the smoothing processing for filling in the gap between the grids by modifying the non-repositioned adjacent grid and making the interval between the non-repositioned grid and the repositioned peripheral grid uniform.

Through the above-described processing, it is possible to realize processing for converting the plot 910 and the grid 920 in FIG. 8 into the plot 911 and the peripheral grid 921 separated from a boundary of the standard color space 702 by an amount corresponding to the stored color difference, positioned on the straight line that connects the plot 910 and the luminosity $L^T$. In the present exemplary embodiment, the CPU 301 modifies the basic 3D LUT to a 3D LUT for executing the above-described color space conversion processing. The modified 3D LUT is transmitted to the camera server 110 from the client apparatus 120 and set to the development processing unit 404 of the processing unit 207.

Through the above-described processing, an image after the color space conversion processing, which maintains the color difference between the recognition target color as the specific color and the identification target color as the peripheral color in the RAW color space, is transmitted to the client apparatus 120 from the camera server 110. Accordingly, a determination precision can be improved with respect to the use case in which importance is placed on a difference between the specific color and its peripheral color in a space having a wide color gamut, e.g., a use case in which a legitimate coin and an illegitimate coin are determined based on a color of the coin included in the image captured by a monitoring camera installed in a recreation hall.

In the above-described exemplary embodiment, the client apparatus 120 modifies the basic 3D LUT. In the below-described exemplary embodiment, the camera server 110 acquires information about a stored color from the client apparatus 120, and the processing unit 207 modifies the basic 3D LUT under the control of the control unit 208 of the camera server 110. Here, an exemplary embodiment in which the camera server 110 executes the processing for generating the 3D LUT by modifying the basic 3D LUT in step S506 in FIG. 6 will be described with reference to the flowchart in FIG. 8.

In a case where the camera server 110 modifies the basic 3D LUT, in step S801 in FIG. 9, the control unit 208 of the camera server 110 acquires from the client apparatus 120 the color information stored as described above. The control unit 208 of the camera server 110 similarly calculates the stored color difference based on the color information acquired from the client apparatus 120.

Next, in step S802, the control unit 208 of the camera server 110 causes the processing unit 207 to execute color space conversion processing similar to the above-described color space processing executed by the CPU 301, i.e., the color space conversion processing of the recognition target color as the specific color. Further, in step S803, the control unit 208 causes the processing unit 207 to similarly execute the color space conversion processing of the identification target color as the peripheral color. Then, the control unit 208 sets a plot having a positional relationship in which the stored color difference acquired in step S801 and a color difference between the plot and the peripheral grid after the color space conversion processing acquired in steps S802 and S803 are substantially equal to each other. Furthermore, the control unit 208 similarly executes the processing continuously if there is a peripheral grid having a color difference with respect to the plot 911 smaller than the stored color difference acquired in step S801.

Next, in step S804, the control unit 208 causes the processing unit 207 to similarly execute smoothing processing of the peripheral grid after the color space conversion processing. Then, the control unit 208 similarly modifies the basic 3D LUT set to the development processing unit 404 of the processing unit 207 to the 3D LUT for executing the color space conversion processing. By using the modified 3D LUT, the camera server 110 can transmit the image after the color space conversion processing which maintains the color difference between the recognition target color as a specific color and the identification target color as a peripheral color in the RAW color space, to the client apparatus 120.

In the above-described exemplary embodiment, a specific color and a peripheral color are specified by the client apparatus 120. However, these colors may be specified by the camera server 110.

In the above-described exemplary embodiment, a specific color and its peripheral color are specified, and a 3D LUT is generated by acquiring a color difference between these colors. However, in order to execute the color space conversion processing, a color difference with respect to a specific color may be specified, and a 3D LUT which maintains the specified color difference may be generated similarly.

In the above-described exemplary embodiment, color space conversion processing is executed by generating the 3D LUT that can maintain a color difference between a specified specific color and its peripheral color. However, the color space conversion processing may be executed by generating a 3D LUT that increases the color difference between the specific color and the peripheral color. The 3D LUT that increases the color difference between the specific color and the peripheral color can be also generated by similarly modifying the basic 3D LUT. If the color space conversion processing for increasing the color difference between the specific color and its peripheral color is executed, a difference between the specific color and the peripheral color can be visually recognized more easily.

Further, modification of the conversion characteristic such as the 3D LUT is not limited to the above. The conversion characteristic may be modified such that a color difference between the specific color and the peripheral color converted by using the conversion characteristic after modification becomes greater than a color difference between the specific color and the peripheral color converted by using the conversion characteristic before modification.

The present invention can be realized in such a manner that a program for realizing one or more functions according to the above-described exemplary embodiments is supplied to a system or an apparatus via a network or a storage medium, so that one or more processors in a computer of the system or the apparatus reads and executes the program. Further, the present invention can also be realized with a circuit (e.g., application specific integrated circuit (ASIC)) that realizes one or more functions.

The above-described exemplary embodiments are merely the examples embodying the present invention, and shall not be construed as limiting the technical range of the present invention. In other words, the present invention can be realized in diverse ways without departing from a technical spirit or main features of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-037241, filed Mar. 2, 2018, which is hereby incorporated by reference herein in its entirety.

What is claimed is:

1. An image processing apparatus comprising:
   at least one processor and/or a circuit configured to function as the following unit:
   a first specification unit configured to specify a specific color in a first color space in image data;
   a second specification unit configured to specify an area including the specific color and a peripheral color of the specific color in the first color space; and
   a control unit configured to control a conversion characteristic for converting image data based on the first color space into image data based on a second color space based on a difference between the specific color and the peripheral color of the specific color in the area in the first color space to maintain a difference between colors in the area in the first color space,
   wherein the control unit changes a first conversion characteristic into a second conversion characteristic such that a color difference between the specific color and the peripheral color converted by the second conversion characteristic is greater than a color difference between the specific color and the peripheral color converted by the first conversion characteristic.

2. The image processing apparatus according to claim 1 further comprising a generation unit configured to generate image data of the first color space,
   wherein the generated image data based on the first color space is converted to image data based on the second color space through the conversion characteristic.

3. The image processing apparatus according to claim 1, further comprising:
   a communication unit configured to communicate with an imaging apparatus which captures image data based on the first color space to convert the image data based on the first color space into image databased on the second color space,
   wherein the communication unit acquires color information about the image data based on the first color space captured by the imaging apparatus,
   wherein a difference between a specific color and a peripheral color of the specific color in the first color space is specified based on the color information acquired by the communication unit, and
   wherein the control unit controls the conversion characteristic of the imaging apparatus based on a difference between the specific color and the peripheral color of the specific color in the first color space.

4. The image processing apparatus according to claim 1, wherein the control unit controls the second conversion characteristic to maintain a difference between the specific color and the peripheral color in the first color space.

5. The image processing apparatus according to claim 1, wherein the control unit controls the second conversion characteristic to increase a difference between the specific color and the peripheral color in the first color space.

6. The image processing apparatus according to claim 1, wherein the control unit controls the second conversion characteristic based on a color difference between the specific color specified by the first specification unit and the peripheral color specified by the second specification unit.

7. The image processing apparatus according to claim 6, wherein the control unit changes the conversion characteristic to the second conversion characteristic in a case where the specific color specified by the first specification unit and the peripheral color specified by the second specification unit fall within a range of the first color space and exceed a range of the second color space.

8. The image processing apparatus according to claim 1, wherein the second specification unit is configured to specify a color difference with respect to the specific color, and
   wherein the control unit controls the second conversion characteristic based on the specific color specified by the first specification unit and the color difference specified by the second specification unit.

9. The image processing apparatus according to claim 1, wherein the conversion characteristic is expressed by a look-up table.

10. The image processing apparatus according to claim 9, wherein the control unit changes a look-up table which expresses the first conversion characteristic to a look-up table which specifies a color separated from a boundary of the second color space by the color difference, positioned on a straight line that connects a luminosity as a target of the conversion and the specific color in the first color space, as the converted specific color in the second color space.

11. The image processing apparatus according to claim 10, wherein the control unit changes a look-up table which expresses the first conversion characteristic to a look-up table which sets the peripheral color in the second color space to establish a positional relationship in which a color difference with respect to the converted specific color in the second color space is equal to a difference between the specific color and the peripheral color in the first color space.

12. The image processing apparatus according to claim 11, further comprising a unit configured to execute smoothing processing for making an interval between grids in the second color space converted based on the changed look-up table uniform.

13. A control method of an image processing apparatus comprising:
- specifying a specific color in a first color space in image data;
- specifying an area including the specific color and a peripheral color of the specific color in the first color space; and
- controlling a conversion characteristic for converting image data based on the first color space into image databased on a second color space based on a difference between the specific color and the peripheral color of the specific color in the area in the first color space to maintain a difference between colors in the area in the first color space,
- wherein the controlling changes a first conversion characteristic into a second conversion characteristic such that a color difference between the specific color and the peripheral color converted by the second conversion characteristic is greater than a color difference between the specific color and the peripheral color converted by the first conversion characteristic.

14. A non-transitory computer-readable storage medium storing a program for causing a computer to execute following steps comprising:
- specifying a specific color in a first color space in image data;
- specifying an area including the specific color and a peripheral color of the specific color in the first color space; and
- controlling a conversion characteristic for converting image data based on the first color space into image data based on a second color space based on a difference between the specific color and the peripheral color of the specific color in the area in the first color space to maintain a difference between colors in the area in the first color space,
- wherein the controlling changes a first conversion characteristic into a second conversion characteristic such that a color difference between the specific color and the peripheral color converted by the second conversion characteristic is greater than a color difference between the specific color and the peripheral color converted by the first conversion characteristic.

* * * * *